(12) United States Patent
Gintz

(10) Patent No.: US 7,974,605 B2
(45) Date of Patent: Jul. 5, 2011

(54) PERSONAL COMMUNICATIONS PROCESSING SYSTEM

(76) Inventor: Richard A. Gintz, Austin, TX (US)

( * ) Notice: Subject to any disclaimer, the term of this patent is extended or adjusted under 35 U.S.C. 154(b) by 702 days.

(21) Appl. No.: 11/862,186

(22) Filed: Sep. 26, 2007

(65) Prior Publication Data

US 2008/0167028 A1 Jul. 10, 2008

Related U.S. Application Data

(60) Provisional application No. 60/827,127, filed on Sep. 27, 2006.

(51) Int. Cl.
*H04M 1/66* (2006.01)
*H04M 1/68* (2006.01)
*H04M 3/16* (2006.01)

(52) U.S. Cl. ... 455/411; 455/41.2; 455/41.3; 455/414.1; 455/455; 455/550.1; 455/556.1; 455/556.2; 455/563; 455/569.1; 370/310.2; 370/328; 370/338; 715/745

(58) Field of Classification Search .................. 455/411, 455/414.1, 466, 550.1, 41.2, 41.3, 556.1, 455/556.2, 558, 563, 569.1; 715/745; 370/310.2, 370/328, 338
See application file for complete search history.

(56) References Cited

U.S. PATENT DOCUMENTS

| 5,794,189 | A | * | 8/1998 | Gould ............................ 704/231 |
| 5,832,489 | A | * | 11/1998 | Kucala .................................. 1/1 |
| 6,169,789 | B1 | * | 1/2001 | Rao et al. ................. 379/110.01 |
| 6,987,948 | B2 | * | 1/2006 | Engstrom et al. ............ 455/41.1 |
| 7,366,990 | B2 | * | 4/2008 | Pitroda ......................... 715/745 |
| 7,392,375 | B2 | * | 6/2008 | Bartram et al. ............... 713/152 |
| 2004/0075687 | A1 | * | 4/2004 | Oshiro et al. ................. 345/752 |
| 2005/0091096 | A1 | * | 4/2005 | Coates et al. ..................... 705/8 |

* cited by examiner

*Primary Examiner* — Stephen M D'Agosta
(74) *Attorney, Agent, or Firm* — Law Offices of Mark L. Berrier

(57) ABSTRACT

Systems and methods for processing personal communications wherein one embodiment comprises a communication processing system which has a data processing system that receives communications from a user. The data processing system authenticates the received communications, selects one of a plurality of actions for processing the communication item, and processes the communication item according to the selected action. The communication includes one or more communication items which may be voice data, text data, or some other form of information. The data processing system may receive communications from devices such as cellular phones and may also transmit generated results to users' phones. The processing performed by the system may, for example, include storing, forwarding or distributing communication items to multiple recipients, converting them to text, using them to generate reminders, and so on. Generated results may be transmitted to the original caller, transmitted to other recipients, stored for later access, etc.

16 Claims, 5 Drawing Sheets

PERSONAL COMMUNICATIONS PROCESSING SYSTEM

CROSS-REFERENCE TO RELATED APPLICATIONS

This application claims the benefit of U.S. Provisional Patent Application 60/827,127, filed Sep. 27, 2006, which is incorporated by reference as if set forth herein in its entirety.

BACKGROUND

1. Field of the Invention

The present invention relates generally to communication and information tracking systems, and more particularly to systems and methods for the recording, storage, distribution and processing of an information item wherein, for example, in a single step, an individual records an information item and has it immediately transmitted to a system for further processing.

2. Related Art

With all the gadgets, devices, and tools that exist in today's mobile world, individuals continue to suffer from the lack of a reliable, readily available, and simple method of remembering and making records of ideas, appointments, and tasks. Automatically receiving follow up reminders and then getting those items "into play" in a timely manner is another issue that is not adequately addressed. It would be desirable to address these two distinct problems with a single, simple solution.

The first problem is that of notating or recording the item that has the potential to be forgotten or lost. The second is the act of delivering that item to a system and/or entity that can take some sort of action on the item, and do it in a timely manner.

It is important to provide a solution that can be initiated with a simple, almost automatic action that requires a minimum number of steps to accomplish the task of recording the item that comes to the user's mind, and then getting that item into a system that can handle any required storage, distribution, and/or execution related to the recorded item. Additionally it is important that any process involved in the solution minimizes the interruption of the user's thought process. In other words, it should cause the minimum amount of distraction between the time the thought of a specific item comes to the user and that item's arrival in a system that can then manage the storage, distribution, and/or execution of tasks associated with the information. The actions taken by the system should not require further action on the part of the user.

There have been many attempts to solve these problems. Until the advent of the ubiquitous presence of the cell phone network, there appeared to be no realistic way to solve them. Essentially every attempt at solving the problems has met with the same fate—each attempted solution has been either incomplete, unreliable, or inconvenient. Often, all three of these issues remained in the prior art "solutions."

If the user is at a computer and that computer has access to the tools necessary to record and transmit the user's information, that is one thing. But increasingly this is NOT the case. Oftentimes, the user has only a cell phone, or some other personal communication device that can behave similarly to a cell phone, and therein lies the problem.

Users of cell phones and other personal communication devices experience a unique problem when attempting to make notes, leave reminders for themselves, or communicate messages and instructions to others. The number of steps that are currently required to do this is excessive, and the methods are essentially unreliable. This problem manifests itself to an even larger extent when users are not in a situation where they can focus on organizing their thoughts, etc. Driving is but one example of this type of situation, but is a common one.

One of the underlying problems need to be solved is that of having to deal with too many interruptions and having to perform too many steps to get the item from the user's mind to the user's "target," and to make sure that any required follow up actions are monitored until that item is acknowledged. Preferably, these things need to be done without user intervention to provide authentication.

As mentioned above, there are existing solutions, but each of these has significant shortcomings. These other solutions include: hand held recorders; email and instant messaging; voicemail to oneself and to others; etc.

Hand Held Recorder

Shortcomings:

1. Hand held recorders can be lost, stolen, or otherwise misplaced; any recordings, of course, that are in the device are also lost.
2. Hand held recorders can reach their capacity. Once that has happened, there is no way to record any further information. The user is right back to the point of the problem—having to depend on their own memory to recall the item.
3. Hand held recorders can lose power and there is often no realistic, immediate alternative method to accomplish the task of remembering the item.
4. The information that is recorded on today's hand held recorders are not transmitted or furnished to a system and/or a person that could do something with it until additional manual steps are taken—oftentimes hours, days or even weeks later!

Email, Instant Messaging

Shortcomings:

1. Composing, entering, and editing tend to leave a user to NOT complete their thought process, thereby possibly eliminating important elements of the communication to the intended recipient.
2. Too much of a mechanical process.
3. Must be at a computer (not available while driving.

Voicemail to the Recipient

Shortcomings:

1. Not every intended recipient of a message has voicemail.
2. Voicemail often has lengthy introductory messages that the user must wait for, again disrupting their thought process and leading to an incomplete communication.
3. The recipient may answer. The thought process is interrupted and an unintended conversation may ensue.
4. When leaving a message on someone else's message machine or voice mail, the user has no record of the message that they left.
5. There is no way a user can know if the message was received by the recipient.
6. There is no guarantee of the privacy of the message—anyone who has access to that phone or message machine can listen to, and even erase the message.

Voicemail to Self (User)

Shortcomings:

1. Not every user has voicemail at a location that they can guarantee will be unanswered.
2. Most cell phone services will not allow you to leave a voicemail to yourself when calling your cell phone from that cell phone.
3. It is either difficult or impossible to capture and save the message left for future reference and/or processing.

Following are some exemplary scenarios in which the shortcomings of other solutions are apparent.

A user could call his own cell phone and leave a message. On most cell phone services, however, this option does not exist. In most such services, upon answering, the user is immediately put into a mode to retrieve his voicemail or perform other operations that are unrelated to the user's intended purpose—that of leaving a message and optionally forwarding it to other parties. In many cases, a person must let the phone ring for some amount of time (to allow the called number to be possibly answered by a human) and then be forced to listen to a distracting message before being given the opportunity to leave his message. All of these factors tend to distract the caller and often cause that caller to forget the message he wanted to leave, in part or in whole. Further, while accomplishing the task of getting the message into a tangible form that can be retrieved at a later time, most systems do not offer the ability to distribute that message to others immediately, nor do they offer a way for the caller to easily access the message for future processing and handling. Further, the above processes do not accomplish the task of recording the information and getting it to the target in a single step with any degree of user authentication.

A user could alternatively call a "land line" and attempt to leave voice mail or a message. Some of the same problems exist as with calling one's own cell phone:
1. The user must wait for the requisite number of rings to occur before the land-line even answers.
2. The user must often wait for a message to be played before leaving a message.
3. Because the user does not have the ability to control other callers leaving messages in their voicemail, the voicemail box may be full.
4. When attempting to retrieve a specific reminder, the user will have to "wade" through other unrelated voicemails before reaching the desired voicemail message/reminder.

There are additional issues that must also be dealt with:
1. The phone system that receives the message may be keyed to call the user's cell phone or pager to inform them that there is a message in their voicemail when, in fact, that message is their own!
2. The phone system voicemail inbox/receiver that receives the message may be available to multiple persons or people that the user may not want to leave said message with.

Again, the above process does not accomplish the task of recording the information and getting it to the target in a single step with authentication.

Alternatively, a user could take any number of steps to fire up a program on a computer, PDA, or even a cell phone to get a message to either themselves or others via SMS, MMS, email, instant message, etc. All of those methods, however, require far more than a single step to get the message to the target.

SUMMARY OF THE INVENTION

This disclosure is directed to systems and methods for processing personal communications that solve one or more of the problems discussed above. In one particular embodiment, there is provided a system having a communications device, a communication channel to communicate with that device, and a processing system whereby the communication is stored, distributed and processed, so that an individual can, with a single action, transmit, store and put into action the communication item. The communications device can be a portable or stationary device. The communication channel can be any wired or wireless communication medium, and the processing system can be any system that automatically distributes and/or processes the communication received from the communications device.

One embodiment comprises a communication processing system. The communication processing system has a data processing system which receives communications from a user. The data processing system is configured to authenticate the received communications received from a user. Each authenticated communication includes one or more communication items to be processed by the data processing system. The data processing system is configured to select one of a plurality of actions for processing the communication item, and to process the communication item according to the selected action.

In one embodiment, the data processing system includes communication devices which are remotely located from the data processing system to initiate the communication to the data processing system and to receive information provided by the data processing system in response to the communication item. The communication devices may, for example, be cellular telephones. Communications from telephones can be authenticated by verifying that the caller-id is an authorized number when the call is received. The data processing system may be coupled to additional data processing systems with which the first data processing system communicates in order to distribute processing of the communication item. For instance, if the communication item to be processed is voice information, the receiving data processing system may pass the voice information to a second data processing system for speech-to-text conversion and a return of the resulting text information. In one embodiment, the system is configured to take a default action unless overridden by indications associated with the communication item (e.g., keypresses by the caller communicating the information) cause an alternative action to be selected.

Another embodiment comprises a method. The method includes receiving a communication from a user, authenticating the communication, selecting an action for processing a communication item contained in the communication, and processing the communication item according to the selected action. The user may communicate via a cellular phone to provide voice data as the communication item. This voice data may be stored, forwarded, distributed to multiple recipients, converted to text, used to generate reminders, or processed in some other manner. Results of the processing may be transmitted to the original caller, transmitted to another recipient (or recipients) stored for later access by the original caller or others, or used as the basis for some other action.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
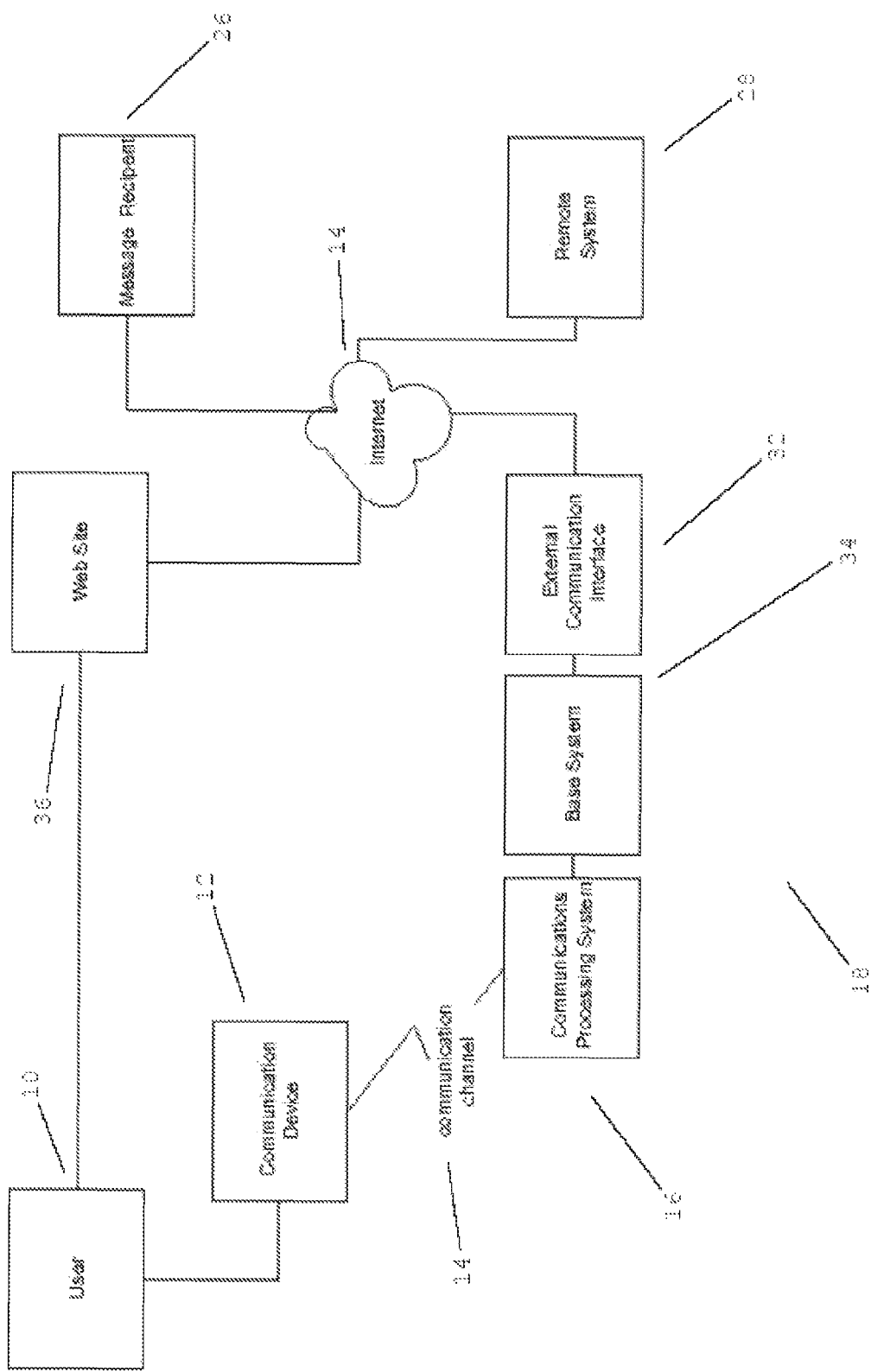
FIG. 1 is a diagram depicting a system for taking notes and instructions from a user and transferring that information to a system for storage, distribution, and processing according to one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for processing personal communications. In one embodiment, a system includes a communications device, a communication channel to communicate with that device, and a processing system. In this system, the communication is stored, distributed and processed, so that an individual can, with a single action, transmit, store and put into action the communication item. The communications device can be a portable or stationary device. The communication channel can be any wired or wireless communication medium, and the processing system can be any system that automatically distributes and/or processes the communication received from the communications device.

The various embodiments of the invention may provide numerous features which are distinctive in comparison to prior art systems and methods. For example, one embodiment of the invention provides a system to authenticate the user utilizing the caller-id of the caller.

Another embodiment of the invention provides a system to receive a communication item in the form of an audio file that is converted to text (speech-to-text) and subsequently create a new communication item composed of the derived text and/or audio file that is processed by the system.

Another embodiment of the invention provides a system to store a communication item for later processing and retrieval.

Another embodiment of the invention provides a system to process the communication item against a set of rules.

Another embodiment of the invention provides a system to process the communication item according to a process flow that allows the user to set up a reminder, or set of reminders that are associated with the communication item.

Another embodiment of the invention provides a system to process a reminder that notifies the sender, plus any party that the sender has designated, of the original communication.

Another embodiment of the invention provides a system to receive a communication item in a recorded format and then automatically transcribe the communication item.

Another embodiment of the invention provides a system to receive a communication item in a recorded format and then translate the communication item into one or more different languages.

Another embodiment of the invention provides a system to receive a communication item comprising a product code.

Another embodiment of the invention provides a system to receive a communication item comprising a product code and transmit that code embedded in a communication item to a remote system that sends product information back to the originator of the communication item.

Another embodiment of the invention provides a system to receive a communication item and interfaces with a contact management system to process the communication item.

Another embodiment of the invention provides a system to receive a communication item that causes information to be exchanged and synchronized between the contact management system and the user of the communication item device.

Another embodiment of the invention provides a system to receive a communication item and cause information to be added or altered on the contact management system based on the content of the communication item.

Another embodiment of the invention provides a system to receive a communication item and cause information to be added or altered on the contact management system in real-time based on the content of the communication item.

Another embodiment of the invention provides a system to receive a communication item that contains a code or other indication that uniquely identifies a store, radio station, TV station, or any other form of entity, and then cause that entity to transmit information back to the sender of that communication item automatically.

Another embodiment of the invention provides a system to receive a communication item from an individual that contains a recording that is stored for later retrieval by another individual.

Another embodiment of the invention provides a system to transmit a text message to an individual or group of individuals to furnish those individuals with a phone number to call to listen to their voice message.

Another embodiment of the invention provides a system that uses the recipient's caller-id as an authentication identifier.

Another embodiment of the invention provides a system that receives a communication item composed of text and converts the text to audio (text-to-speech) and creates a new communication item that includes both the text and/or audio representation of the original communication item.

Another embodiment of the invention provides a system that receives a communication item from a voice recorder.

Another embodiment of the invention provides a system that processes a communication item and performs search functions on internet and web search engines, the results of which are then stored for later retrieval by authorized users.

As shown in FIG. 1, one exemplary embodiment of a system includes the following elements:
User
Communication device
Communication channel
Base system
Context flow
Authentication process
Pending messages
Message recipient
Remote system
Reminder record
External communication interface
Communications processing system
Web site In this embodiment, the user 10 initiates communication with the base system 16 utilizing a communication device 12 over communication channel 14 as determined by the capabilities of the communication device 12. The base system 16 performs its authentication process 20 upon receiving the call from the user 10. Once the user 10 has been authenticated, the base system 16 then communicates to the communications processing system 34 to determine the context flow 18 that should be used to communicate with said user 10.

The base system 16 receives its operational steps from the communications processing system 34 and, based on the context flow 18 that has been assigned by the communications processing system 34, requests information and instruction from the user 10 and furnishes information to the user 10 via the communication device 12 through the communication channel 14.

In one embodiment of the invention, the user 10 performs a speed-dial operation on a cell phone (communication device 12) and the base system 16 asks for a verbal utterance from the user 10 and, based on that utterance, converts the utterance into text that it passes to the communications processing system 34 via a message packet. The communications processing system 34 then processes that text against a table of text values to determine that the user 10 has requested information from a broadcast entity such as a radio or television station. The communications processing system 34 then creates a message packet that is compatible with an external communication interface 32 and then transmits that message packet through a communication channel 14 to a remote system 28 that is able to read and understand the message packet. The remote system 28 may be a computer system or any other device capable of reading and understanding the contents of the message packet. The remote system 28 then processes the message packet and performs its own operations, which may consist of automatic operations, as well as operations that might include manual actions by machines or humans. The remote system 28 then prepares a response message packet that is compatible with the communications processing system 34 that includes the information requested by the communications processing system 34 message packet. Such information includes, but is not limited to, program information, advertiser information, the most recently played songs, future playlists, future broadcasts, references to websites that relate to the subject matter requested.

This system may, for example be used to distribute information from a radio or television station. A user can call in to the system and say the name of the station, the call letters of the station or some other identifier of the station. The system can recognize the identifying information, send a message packet to a remote system, receive information transmitted back from the remote system in response to the message packet, and then forward the received information to the user. The information may be provided as text, recorded voice messages, or other types of information. In this way, a user can easily obtain information such as the last 10 songs played by a radio station, where to get details on promotions advertised by the station, information on advertisers, etc.

In another embodiment of the invention, the user 10 uses a microphone and headset on the computer as the communication device 12 and through the intranet/internet communication channel 14 contacts the base system 16 which asks for a verbal utterance or keypress, converts the response from the user 10 into text that is passes to the communications processing system 34 via a message packet. The communications processing system 34 then process that text against a table of text values to determine that the user 10 has requested the availability of a certain item from a set of known web site 36 and remote systems. The communications processing system 34 then prepares separate message packet messages to be transmitted through the internet communication channel 14 to each remote system 28 and web site 36. Upon receipt of these message packets, the remote systems and web sites respond according to their own internal methods and processes and prepare message packets compatible with the communications processing system 34 and send them back to the communications processing system 34 through a communication channel 14 that is compatible between the communications processing system 34 and each specific remote system 28 or web site 36.

In another embodiment of the invention, the user 10 uses a cell phone (communication device 12) to call the base system 16 and through a series of voice utterances and/or touch-tone commands, performs dictation functions. After the performance of said dictation, the base system 16 prepares a message packet and sends it to the communications processing system 34. The communications processing system 34 then examines the profile of the user 10 to determine how that dictation audio should be processed and prepares a message packet that is compatible with a specific remote system 28 or web site 36 and then using the appropriate communication channel 14, transmits the message packet to the correct remote system 28 or web site 36 destination for that system or human to perform transcription services based on the content of the message packet. Upon completion of the transcription, the another message packet is prepared by the remote system 28 or web site 36 and sent back to the communications processing system 34 for it to process the next step of an ordered number of steps based on the content of the message packet received by the communications processing system 34.

In another embodiment of the invention, the user 10 uses a phone (communication device 12) to call the base system 16 and through a series of voice utterances and/or touchtone commands, causes the communications processing system 34 to set up reminders based on specific dates and times; such dates and times being set specifically by the user 10 or by certain asynchronous events happening in each remote system 28 or web site 36 that the communications processing system 34 maintains communications with. Each reminder or group of reminders associated to a specific communication session can be set according to a set of rules maintained by the communications processing system 34.

In another embodiment of the invention, the user 10 sets or unsets a flag to tell the communications processing system 34 to notify the user 10 that a single or any message recipient 26 has received and read a sent message or reminder, either on a web site 36 connected through a communication channel 14 to the communications processing system 34 or from a communication device 12 connected by a communication channel 14 to the communications processing system 34.

In another embodiment of the invention, the user 10 sets the profile of a message recipient 26 to indicate that messages sent by user 10 through the communications processing system 34 are to be translated to a language other than the language set in the original message.

In another embodiment of the invention, the user 10 uses a communication device 12 to make a connection to the communications processing system 34 through a communication channel 14 and base system 16 to furnish a UPC product code, whereby the communications processing system 34 incorporates that product code into a message packet along with processing requests and response instructions that can be read and understood by a remote system 28 or web site 36. The remote system 28 or web site 36 processes the request according to the UPC code and the processing request as furnished by the communications processing system 34, performs its own internal steps to fulfill the processing request and prepare the requested output. Upon completion of processing the remote system 28 or web site 36 transmits the results according to the response instructions as found in the message packet it received from the communications processing system 34.

In another embodiment of the invention, the user 10 uses a communication device to make a connection to the communications processing system 34 through a communication channel 14 and base system 16 whereby the communications processing system 34 establishes a connection to a remote system 28 or web site 36 via an external communication interface 32 through a communication channel 14 that maintains a contact management system. The user 10, through any combination of utterances and/or touchtones requests information from said contact management system. Additionally, the user 10 may use the communication device 12 to cause entries to be created, modified, or deleted from said contact management system.

In another embodiment of the invention, the user 10 uses a communication device to make a connection to the communications processing system 34 through a communication channel 14 and base system 16 to indicate an intended message recipient 26 or group of message recipients whereby the communications processing system 34 receives an audio recording and stores said recording in its system for later retrieval by each intended message recipient 26. The message recipient 26, as a user 10 in this context, uses their phone to make a connection to the communications processing system 34 through a communication channel 14 and base system 16 to retrieve and respond to said message. The communications processing system 34 uses the caller-id of the message recipient 26 and a pin-code provided to the message recipient 26 in their initial notification message to authenticate the user 10 and to grant access to the stored audio file.

Figure 2:
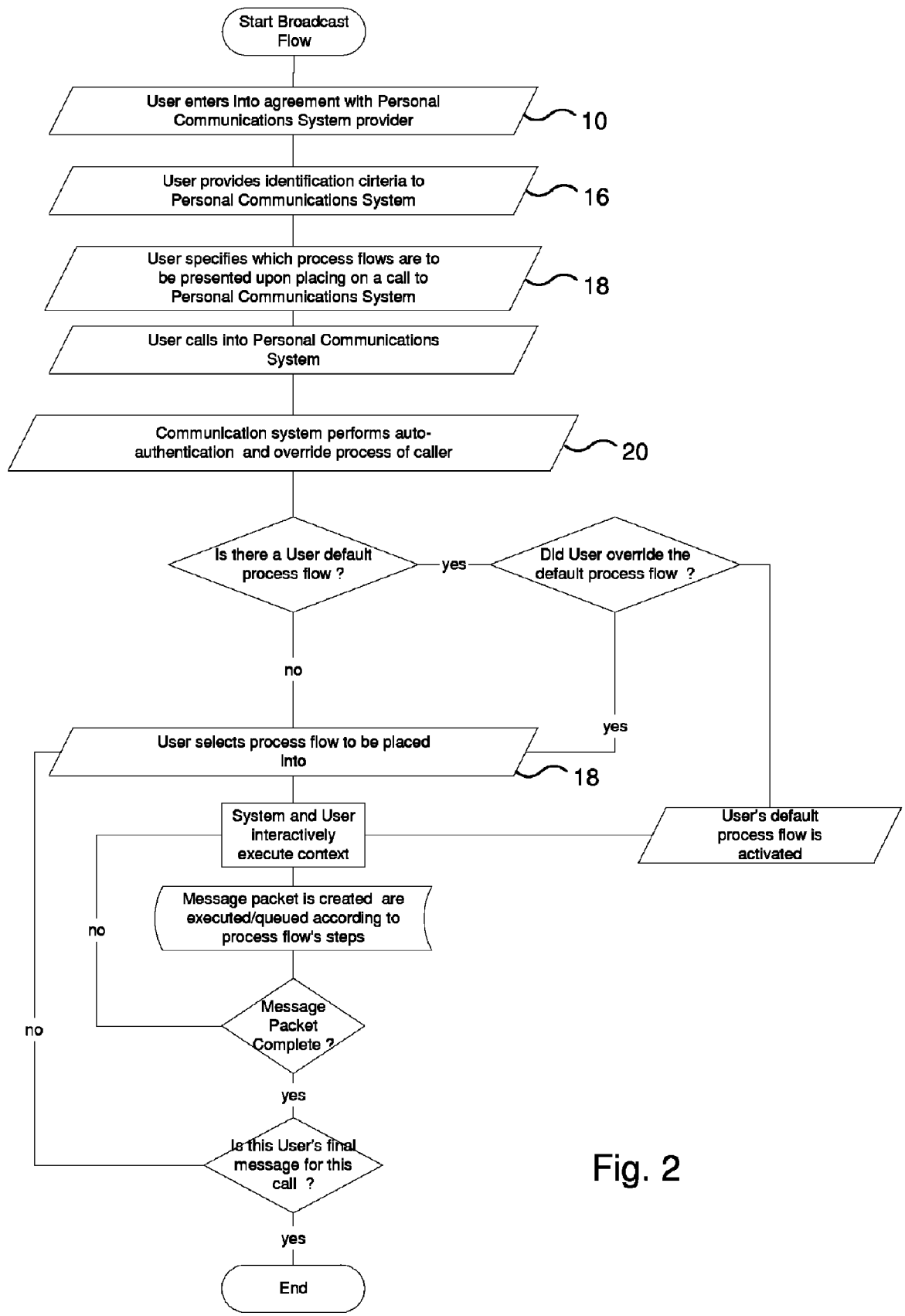
FIG. 2 is a diagram depicting an approach for taking notes and instructions from a user and transferring that information to a system for storage, distribution, and processing according to one embodiment.

According to FIG. 2, a user enters into an agreement with the Personal Communications Service Provider. The user provides identification criteria to the provider to store into the base system, including, but not limited to the caller-id of the user's communication device, which can be matched to a list of caller-id's for authorized users. From a menu presented by the base system the user selects the process flows that the user wishes to have presented or have available to them at the beginning of each call.

Figure 3:
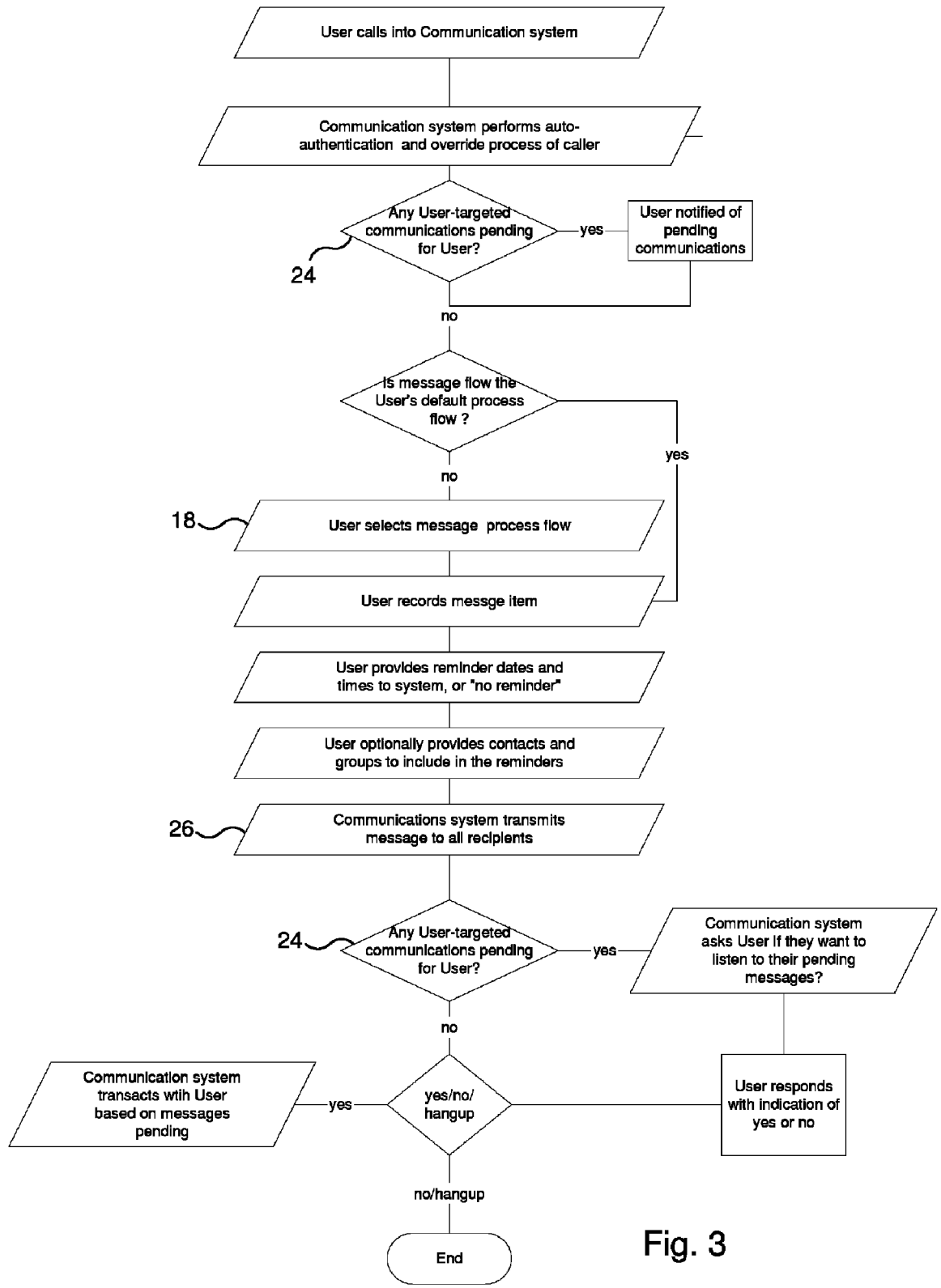
FIG. 3 is a flow diagram depicting an approach for processing a communication item as a message to self and/or others according to one embodiment.

According to FIG. 3, the user places a call to the base system via the user's communication device over the communication channel as determined by the capabilities of the communication device. The base system performs its authentication process upon receiving the call from the user. Once the user has been authenticated, the base system checks its database to determine if there is one or more pending messages for this user. If there are any pending messages for the user, the user is notified by a method defined and set up by the user prior to this call. The base system then fetches from the user profile the user configuration of context flow items and starts its call flow from the default context flow that the user selected at time of setup. If the user does not have a default context flow, then the user will be presented with all the context flow options the user selected at time of setup and the user will be asked to select a context flow in order to continue the call.

For the basic message context flow, the user records a message packet that is then stored on the base system. Upon completion of the recording process, the base system then presents the user with the option of setting up a reminder or set of reminders that relate to this recorded message. Upon verification of the reminders by the user, the communication processing system establishes an individual reminder record for each reminder that is to be acted upon.

Figure 4:
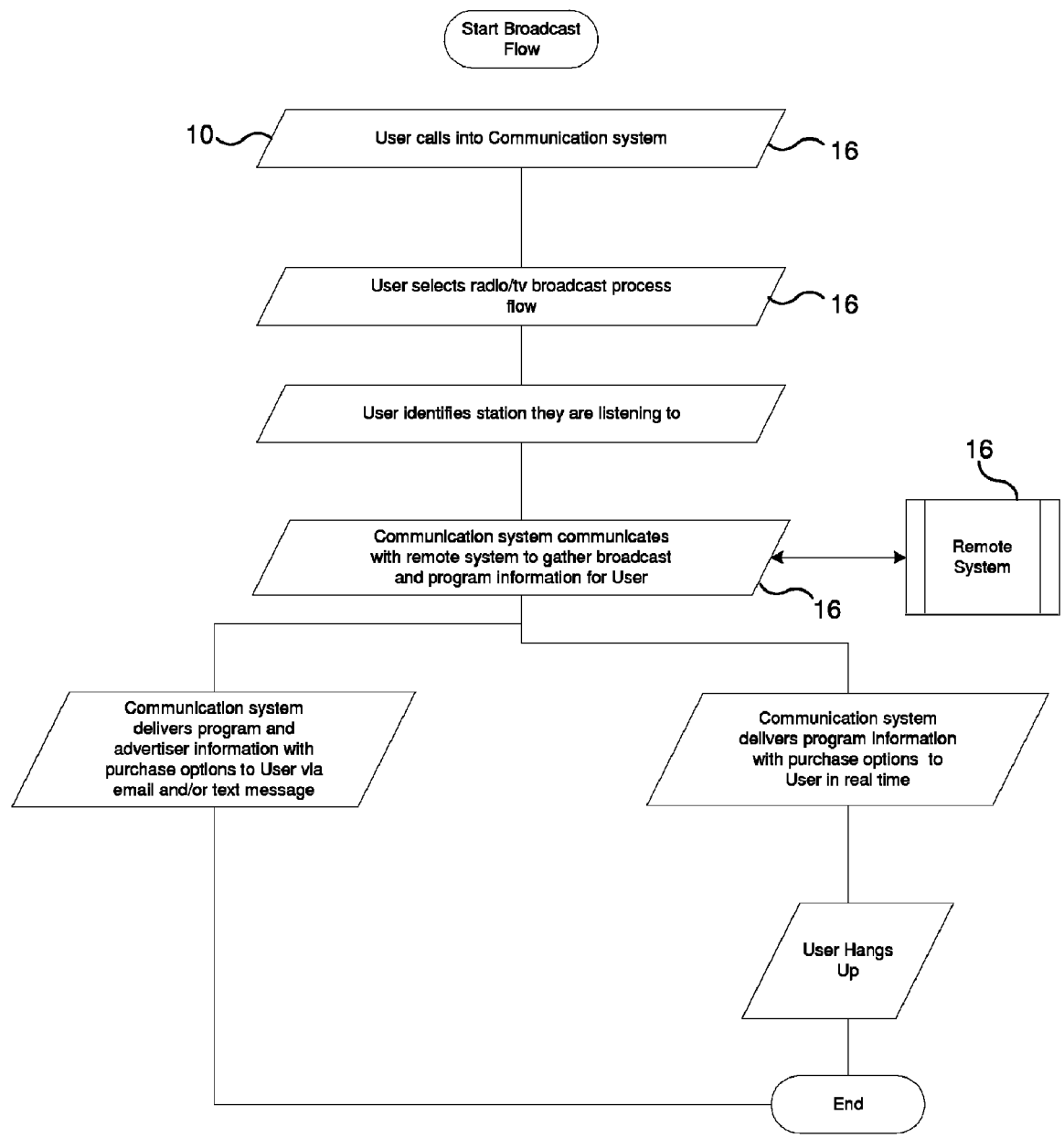
FIG. 4 is a diagram depicting an approach for processing a communication item as a request for program information, advertiser information, and purchase options from a broadcast entity according to one embodiment.

FIG. 4 depicts the broadcast context flow, the user tells the communication processing system that they want to enter the broadcast context flow. The base system will then prompt the user to indicate the broadcast entity that they want to obtain program and other information from. Upon a successful match to a broadcast entity that the base system has in its database, the base system will communicate a request for the desired information to the broadcast entity's remote system and then wait to receive the requested information from that remote system. The base system will then speak the information to the user via communication channel to the user's communication device and send a message packet that contains the broadcast entity's information to the user via email.

Figure 5:
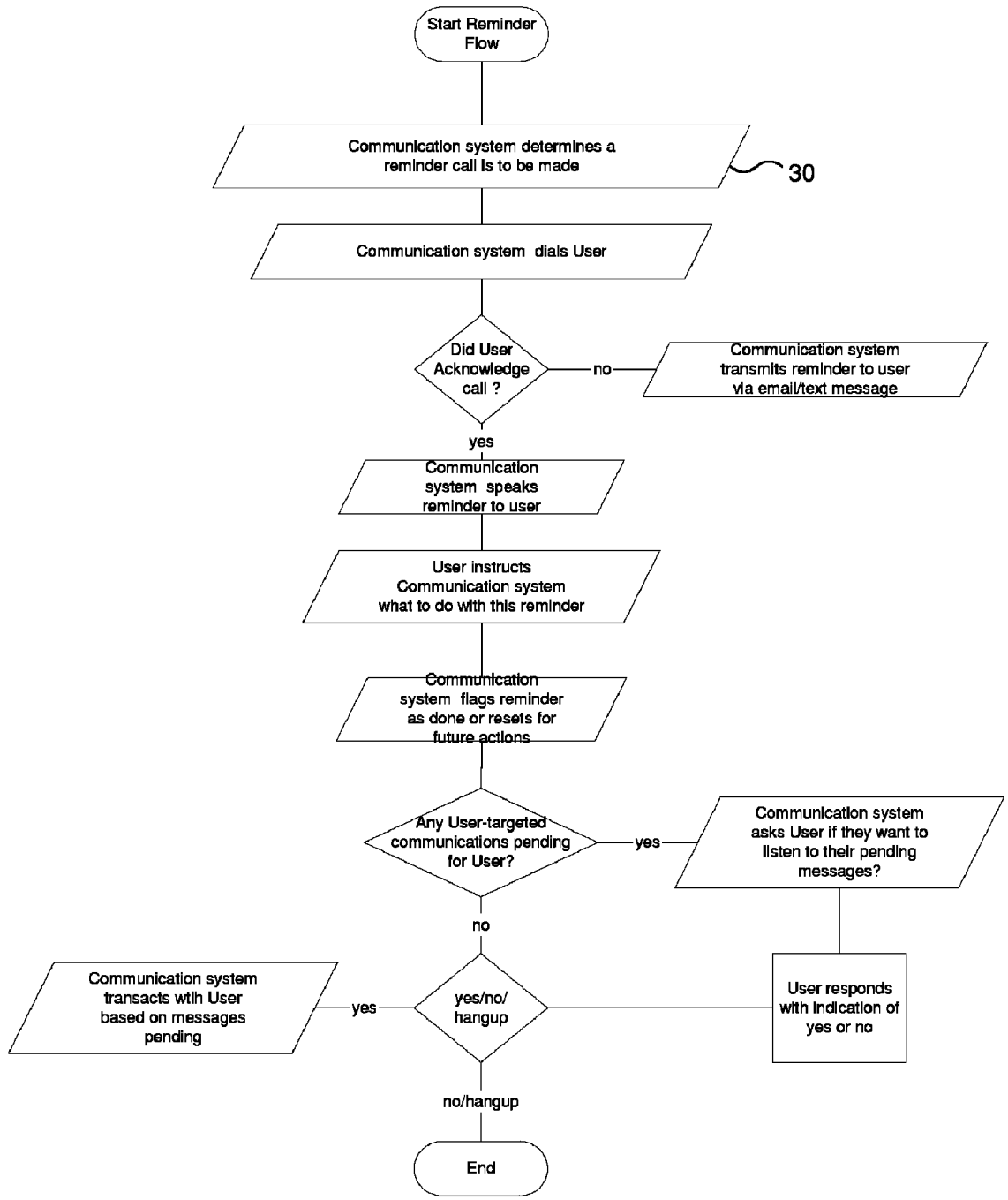
FIG. 5 is a diagram depicting an approach for processing a reminder to an individual or collection of individuals according to one embodiment.

FIG. 5 depicts the reminder context flow, the base system continually monitors the progress of each reminder record and upon the appropriate trigger (usually determined by the arrival of the reminder's date and time), performs the reminder's actions as determined by the parameters of the message recipient, as well as the reminder and contact parameters that the user has set up.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:
1. A communication processing system comprising:
A first electronic data processing apparatus configured to authenticate a communication received from a user,
receive a communication item contained in the communication,
select one of a plurality of actions for processing the communication item, and
process the communication item according to the selected action;
a second electronic data processing apparatus which is separate from the first data processing apparatus;
wherein the first electronic data processing apparatus is configured to transmit first data to the second electronic data processing apparatus in response to receiving the communication item;
wherein the second electronic data processing apparatus is configured to process the first data, to generate second data based on the first data and to return second data to the first electronic data processing apparatus;

wherein the first electronic data processing apparatus is configured to complete the selected action based on the second data received from the second electronic data processing apparatus;

wherein the communication item comprises voice information specifying an identifier to a radio station;

wherein the first electronic data processing apparatus is configured to recognize the identifier and to transmit a message to the second electronic data processing apparatus;

wherein the second electronic data processing apparatus is configured to transmit information associated with the radio station to the first electronic data processing apparatus in response to the message;

wherein the first electronic data processing apparatus is configured to transmit the information associated with the radio station to a user that submitted the communication item.

2. The communication processing system of claim 1, further comprising a communication device which is remotely located from the first electronic data processing system, wherein the communication device is coupled to the first electronic data processing system by a communication channel.

3. The communication processing system of claim 2, wherein the communication device comprises a wireless telephone and the communication channel comprises a wireless telephone channel.

4. The communication processing system of claim 1, further comprising a recipient device coupled to the first electronic data processing system, wherein the first electronic data processing system is configured to deliver information to the recipient device according to the selected action.

5. The communication processing system of claim 1, wherein the first electronic data processing system is configured to authenticate the communication received from the user by verifying that a caller-id associated with the received communication matches is one of a set of caller-id's associated with authorized users.

6. The communication processing system of claim 1, wherein the received communication item comprises voice information.

7. The communication processing system of claim 6, wherein selecting one of the plurality of actions for processing the communication item comprises converting the voice information to text information and comparing the text information to a table of text values and selecting from the table one of the plurality of actions corresponding to the text information.

8. The communication processing system of claim 1, wherein the first electronic data processing system is configured to select a designated default action unless an alternate action is indicated in the communication received from the user.

9. A method for processing communications comprising:
receiving a communication from a user;
authenticating the communication;
selecting one of a plurality of actions for processing a communication item contained in the communication, wherein the communication item comprises voice information specifying an identifier to a radio station;
processing the communication item according to the selected action;
in response to receiving the communication item
transmitting first data from a first electronic data processing system to a second electronic data processing system,
processing the first data in the second electronic data processing system to generate second data based on the first data,
returning the second data to the first electronic data processing system, and
completing the selected action based on the second data received from the second electronic data processing system;
the first electronic data processing system recognizing the identifier and transmitting a message to the second electronic data processing system;
the second electronic data processing system transmitting information associated with the radio station to the first electronic data processing system in response to the message; and
the first electronic data processing system transmitting the information associated with the radio station to a user that submitted the communication item.

10. The method of claim 9, further comprising generating the communication in a communication device which is remotely located from the first electronic data processing system and transmitting the communication from the communication device to the first electronic data processing system via a communication channel.

11. The method of claim 10, wherein the communication device comprises a wireless telephone and the communication channel comprises a wireless telephone channel.

12. The method of claim 9, further comprising, in response to receiving the communication item, delivering information to a recipient device according to the selected action.

13. The method of claim 9, further comprising authenticating the communication received from the user by verifying that a caller-id associated with the received communication matches is one of a set of caller-id's associated with authorized users.

14. The method of claim 9, wherein the received communication item comprises voice information.

15. The method of claim 14, wherein selecting one of the plurality of actions for processing the communication item comprises converting the voice information to text information and comparing the text information to a table of text values and selecting from the table one of the plurality of actions corresponding to the text information.

16. The method of claim 9, wherein selecting one of the plurality of actions for processing the communication item comprises selecting a designated default action unless an alternate action is indicated in the communication received from the user.

* * * * *